(12) United States Patent
Kim

(10) Patent No.: US 6,381,710 B1
(45) Date of Patent: Apr. 30, 2002

(54) ERROR LOGGING METHOD UTILIZING TEMPORARY DEFECT LIST

(75) Inventor: Hack-Bin Kim, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 08/542,418

(22) Filed: Oct. 12, 1995

(30) Foreign Application Priority Data

Apr. 7, 1995 (KR) .............................................. 95-8118

(51) Int. Cl.[7] .................................................. H02H 3/05
(52) U.S. Cl. ........................................ 714/45; 714/723
(58) Field of Search ..................... 395/183.21; 371/21.6, 371/5.5; 714/45, 723, 708

(56) References Cited

U.S. PATENT DOCUMENTS

| | | | |
|---|---|---|---|
| 3,906,200 A | * 9/1975 | Petschaver | 371/21.6 X |
| 3,999,051 A | * 12/1976 | Petschaver | 235/153 AK |
| 4,456,995 A | * 6/1984 | Ryan | 371/21.6 |
| 4,736,373 A | * 4/1988 | Schmidt | 371/21.6 X |
| 4,782,487 A | 11/1988 | Smelser | 371/21 |
| 4,788,684 A | 11/1988 | Kawaguchi et al. | 371/21 |
| 4,876,685 A | 10/1989 | Rich | 371/21.6 |
| 4,964,129 A | 10/1990 | Bowden, III et al. | 371/40.2 |
| 4,964,130 A | * 10/1990 | Bowden, III | 371/21.6 X |
| 5,005,165 A | 4/1991 | Yamanaka et al. | 369/58 |
| 5,200,959 A | 4/1993 | Gross et al. | 371/21.6 |
| 5,216,672 A | 6/1993 | Tatosian et al. | 371/21.1 |
| 5,233,614 A | * 8/1993 | Singh | 371/21.6 |
| 5,422,890 A | 6/1995 | Klingsporn et al. | 371/21.6 |
| 5,475,693 A | * 12/1995 | Christopherson | 371/21.6 X |

* cited by examiner

Primary Examiner—Dieu-Minh Le
(74) Attorney, Agent, or Firm—Robert E. Bushnell, Esq.

(57) ABSTRACT

An error logging method utilizes a temporary defect list to store errors produced at or above a predetermined occurrence frequency during a defect detecting test. The method includes the steps of: determining whether an error is recorded on a temporary defect list, determining whether the error is recorded on an error frequency list when the error is not recorded on the temporary defect list, adding the error to the error frequency list if the error is not recorded on the error frequency list, increasing the occurrence frequency of the error if the error is on the error frequency list, and adding the error to the temporary defect list if the error has an occurrence frequency greater than or equal to a threshold value established as a standard for classifying an error as a defect. The temporary defect list can be used as a final error list, and thereby reduce memory requirements.

20 Claims, 2 Drawing Sheets

ERROR LOGGING METHOD UTILIZING TEMPORARY DEFECT LIST

CROSS-REFERENCE TO RELATED APPLICATIONS

This application makes reference to, incorporates the same herein, and claims all benefits accruing under 35 U.S.C. §119 from an application for Error Logging Method Utilizing Temporary Defect List earlier filed in the Korean Industrial Property Office on Apr. 7, 1995 and there assigned Ser. No. 8118/1995.

BACKGROUND OF THE INVENTION

The present invention relates generally to an error logging method for a hard disk drive device and, more particularly, to an error logging method utilizing a temporary defect list to increase memory capacity by distinguishing errors which are produced at or above a predetermined frequency during an error detecting test.

Generally, media defects exist in the storage medium (e.g., a magnetic disk) of a hard disk drive device. When the areas of the hard disk having such defects are used to store data, problems are likely to occur during the reproduction of the data. To prevent this problem, it is often necessary that the defects be detected during a manufacturing process of the magnetic disk, and that areas having defects not be used to store data.

On prior art reference seeking to provide diagnostic testing for a computer memory is disclosed in U.S. Pat. No. 5,216,672 entitled Parallel Diagnostic Mode For Testing Computer Memory issued to Tatosian et al. on Jun. 1, 1993. In Tatosian et al. '672, a computer memory testing system includes a plurality of memory modules each equipped with error detecting and correcting circuitry. Each of the modules is operable in a diagnostic test mode wherein read and write tests of the modules are performed in parallel. While conventional art, such as Tatosian et al. '672, performs a memory error detection function, I note that there has been no attempt to reduce the memory capacity required to store compilations of these errors.

SUMMARY OF THE INVENTION

Accordingly, it is an object of the present invention to provide an improved error logging method for a hard disk drive device.

It is another object to provide an error logging method utilizing a temporary defect list that prevents the redundant storage of errors which are repeatedly produced.

It is still another object to provide an error logging method that eliminates the need for using an auxiliary memory to store an error list.

To achieve these and other objects, there is provided an error logging method utilizing a temporary defect list according to the principles of the present invention. The method includes the steps of: determining whether an error is recorded on a temporary defect list, determining whether the error is recorded on an error frequency list when the error is not recorded on the temporary defect list, adding the error to the error frequency list if the error is not recorded on the error frequency list, increasing the occurrence frequency of the error if the error is on the error frequency list, and adding the error to the temporary defect list if the error has an occurrence frequency greater than or equal to a threshold value established as a standard for classifying an error as a defect. The error logging method of the present invention has the advantage in that errors produced at or above a predetermined occurrence frequency are distinguished by using the temporary defect list while storing errors in a defect detecting test. Since the temporary defect list can be used as a final error list, the memory capacity required for storing a final error list can be reduced.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar elements components, wherein.

DETAILED DESCRIPTION OF THE INVENTION

Figure 1:
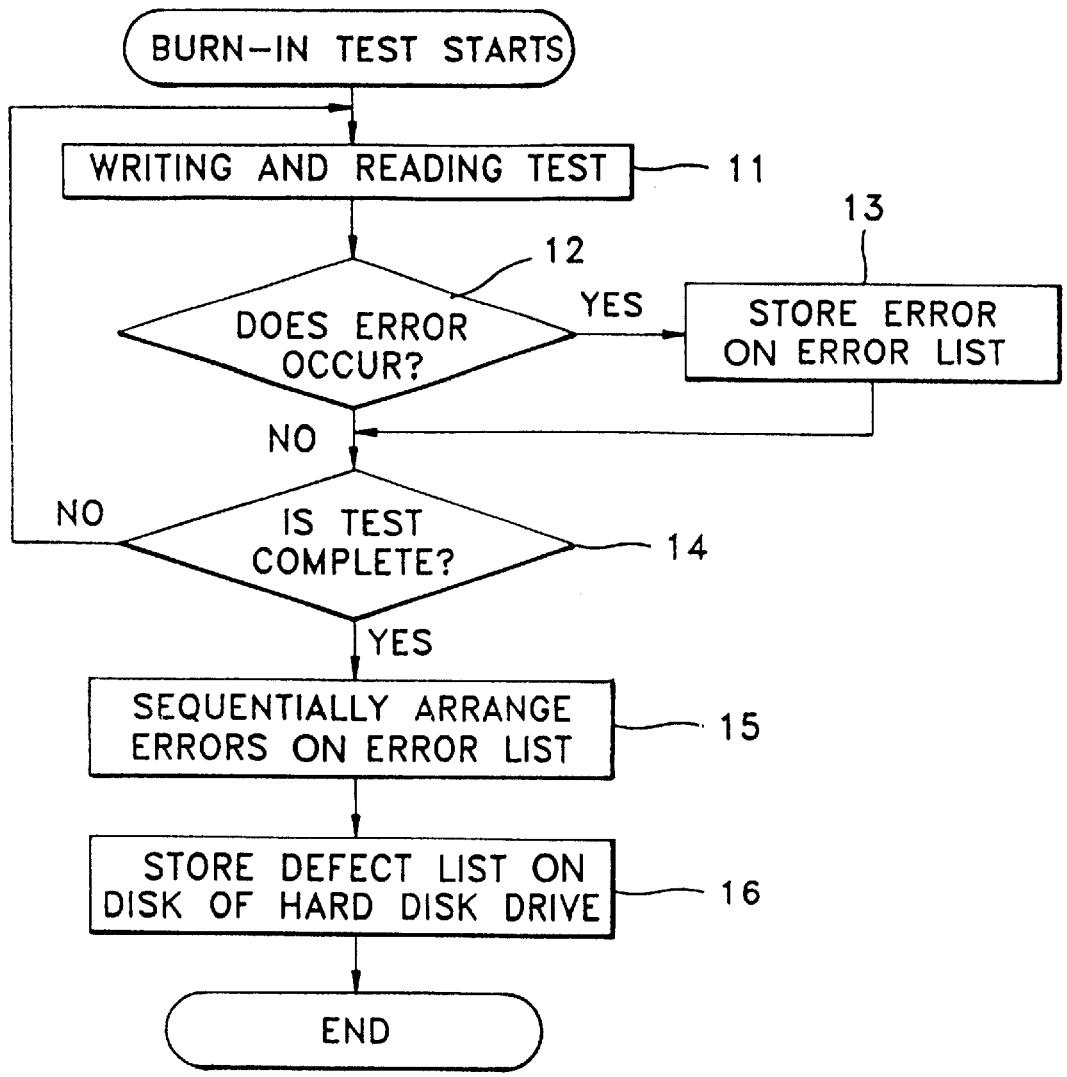
FIG. 1 is a flow chart showing a conventional test for detecting defects in data areas of a hard disk during a manufacturing process.

Turning now to the drawings and referring to FIG. 1, a flow chart showing a conventional test method for detecting media defects in a data area during a manufacturing process of a storage disk is illustrated. According to FIG. 1, when a burn-in test (i.e., a repeated writing and reading process) begins, data is written and read out in step 11. In step 12, it is determined whether an error is produced, while the operation of writing and reading data is being repeated. If an error is produced, the error is recorded on an error list, in step 13. When the test is determined to be complete, in step 14, the errors on the error list are arranged in sequence, in step 15. Then, a list of the media defects (i.e., errors produced repeatedly) is compiled, and areas having such defects are classified and processed as "DEFECT" areas which are not to be used as data storage areas during normal operation of the hard disk drive device. The processed defect list is then stored on the storage disk of the hard disk drive device, in step 16.

With the conventional test method of FIG. 1, the results of the test are used to ensure the consistency of the list containing the errors which occur in the course of reading out data after writing the data. As a result, errors are produced very frequently during the repeated writing and reading test in data areas having a large quantity of media defects. Accordingly, a memory having a large data storage capacity is required to store the error list. Since the memory used is often limited in capacity, an auxiliary memory may be required to store the entire error list. Also, with the conventional test method, there is a problem in that repeatedly occurring errors may be stored repeatedly.

The error logging method of the present invention will now be described. To perform the error logging method of the present invention, a temporary defect list is prepared for storing errors having frequencies at or above a given threshold. These errors are classified as defects. An error frequency list is used to record the positions of the errors and their respective frequencies. An error list is used to record all errors in the order that they occurred. These lists are established by a user on a computer. When the lists are established, the testing procedures begin.

Figure 2:
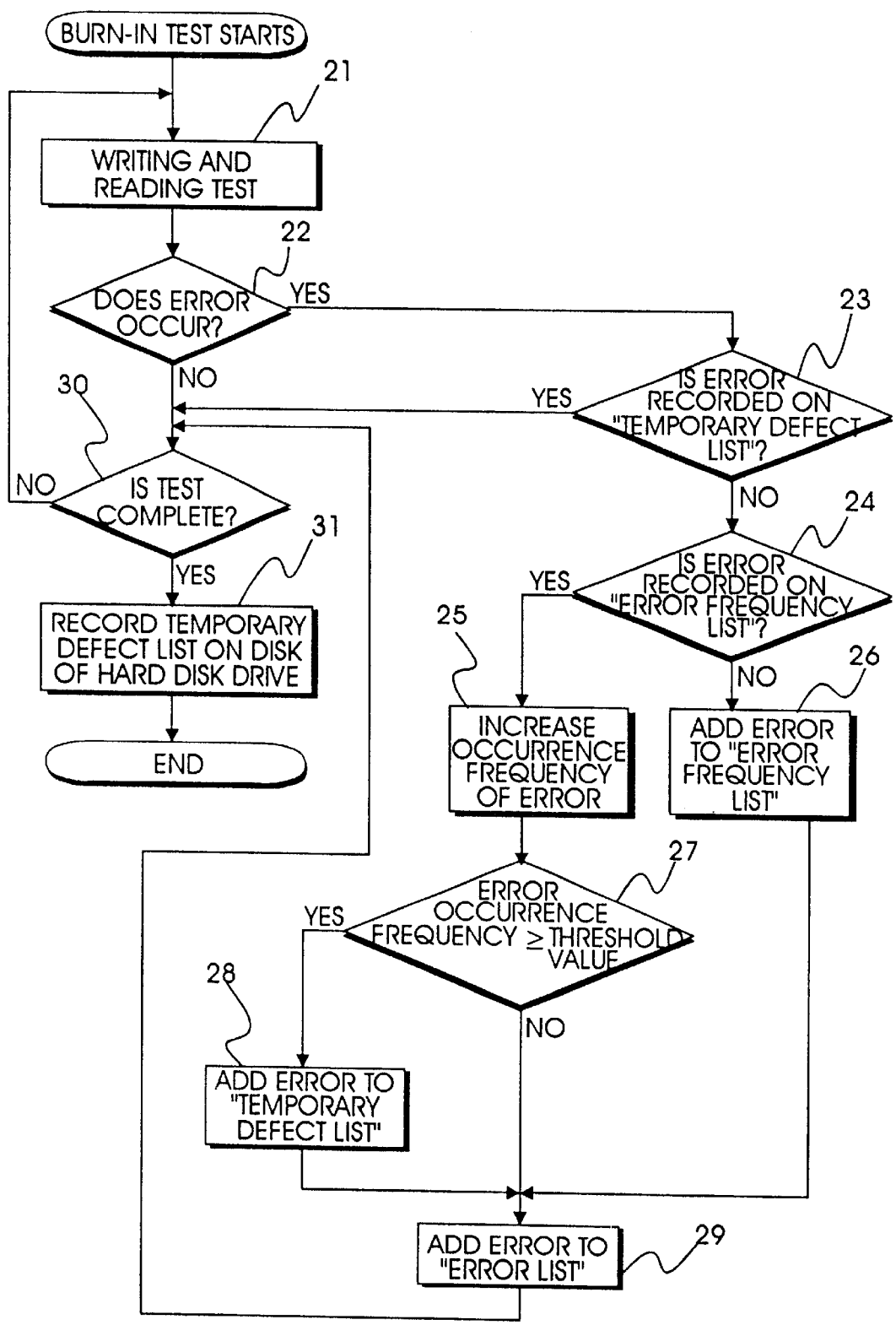
FIG. 2 is a flow chart showing an error logging method utilizing a temporary defect list according to the principles of the present invention.

Referring now to FIG. 2, the steps of the error logging method of the present invention are shown. In FIG. 2, when a burn-in test begins, data having a predetermined pattern is first written onto a surface of the hard disk, in step 21. In order to increase the defect detection rate, a predetermined stress condition is added to the reading operation. The stress condition can include changes in the data pattern, reading off-tracks, adjustment of the data detection threshold, limitation of the correction ability of a hardware error correcting code (ECC), changes in a synchronization pattern, etc. After the stress condition is added, the data is read from the hard disk, in step 21. In step 22, errors are detected while the writing and reading operations are repeated. When no error has occurred, in step 22, the method proceeds to step 30, where it is determined whether the test is complete. If, however, an error is detected, in step 22, a determination is made as to whether the detected error has been previously recorded on the temporary defect list, in step 23. If the error has been recorded on the temporary defect list, the error is not stored, and step 30 is performed. If the error has not been recorded on the temporary defect list, in step 23, a determination is made as to whether the error has been previously recorded on the error frequency list, in step 24. If the error has been recorded on the error frequency list, in step 24, the occurrence frequency of the error is increased, in step 25. If, however, the error has not been recorded on the error frequency list, in step 24, the error is added to the error frequency list, in step 26.

In step 27, it is determined whether the error has an occurrence frequency greater than or equal to a threshold value. The threshold value indicates the point at which a series of errors are classified as a defect. If the error has an occurrence frequency greater than or equal to the threshold value, the error is added to the temporary defect list, in step 28. If, however, the error has an occurrence frequency not greater than or equal to the threshold value, in step 27, the error is added to the error list, in step 29. The method then advances to step 30 where it is determined whether the test is complete according to system procedures. If it is determined that the test is complete, in step 30, the temporary defect list is recorded on the storage disk of the hard disk drive, in step 31.

According to the principles of the present invention, after the burn-in test is complete, the temporary defect list includes all of the sectors having an error occurrence frequency greater than or equal to the threshold value for classifying errors as a defect. The temporary defect list can be used as a final defect list.

As described above, the error logging method according to the present invention distinguishes among errors having a predetermined occurrence frequency or above by maintaining and updating an error frequency list and a temporary defect list during an error detecting test. Accordingly, the present invention offers the advantages of increasing data storage capacity and preventing the redundant storage of repeatedly occurring errors.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. An error logging method, comprising the steps of:
   detecting a first error while reading data from a magnetic disk;
   determining whether said first error has been previously recorded on a defect list, said defect list for storing errors that are classified as defects of said magnetic disk;
   when said first error has not been previously recorded on said defect list, determining whether said first error has been previously recorded on a first error list, said first error list for storing positions of errors on said magnetic disk and occurrence frequencies of the errors;
   when said first error has not been previously recorded on said first error list, recording said first error on said first error list;
   when said first error has been previously recorded on said first error list, increasing a value indicative of an occurrence frequency of said first error; and
   when said value indicative of said occurrence frequency of said first error is greater than or equal to a threshold value, recording said first error on said defect list.

2. The method as claimed in claim 1, further comprising a step of recording said first error on a second error list after said step of recording said first error on said defect list, said second error list for sequentially storing all of the errors detected while reading the data from said magnetic disk.

3. The method as claimed in claim 1, further comprising a step of recording said first error on a second error list when said value indicative of said occurrence frequency of said first error is not greater than said threshold value, said second error list for sequentially storing all of the errors detected while reading the data from said magnetic disk.

4. The method as claimed in claim 1, wherein the data is read from said magnetic disk in accordance with a predetermined pattern formed on a surface of said magnetic disk.

5. The method as claimed in claim 1, wherein the data is read from said magnetic disk in accordance with predetermined stress conditions to increase a rate of detecting the defects of said magnetic disk.

6. The method as claimed in claim 5, wherein said predetermined stress conditions comprise: reading the data from said magnetic disk pursuant to an altered data pattern, reading the data from off-tracks, adjusting a data detection threshold, limiting a correction ability of a hardware error correcting code, and reading the data from said magnetic disk pursuant to an altered synchronization pattern.

7. The method as claimed in claim 6, further comprising a step of writing the data onto said surface of said magnetic disk prior to said step of reading the data from said magnetic disk.

8. The method as claimed in claim 1, further comprising a step of storing said defect list on said magnetic disk as a final compilation of the defects of said magnetic disk.

9. A method for logging errors detected on a surface of a magnetic disk, comprising the steps of:
   writing data onto said surface of said magnetic disk;
   reading the data from said surface of said magnetic disk;
   determining whether a first error has been detected while reading the data from said surface of said magnetic disk;
   when said first error has been detected, determining whether said first error has been previously recorded on a defect list, said defect list for storing errors that are classified as defects of said magnetic disk;

when said first error has not been previously recorded on said defect list, determining whether said first error has been previously recorded on a first error list, said first error list for storing positions of errors on said magnetic disk and occurrence frequencies of the errors;

when said first error has not been previously recorded on said first error list, recording said first error on said first error list;

when said first error has been previously recorded on said first error list, increasing a value indicative of an occurrence frequency of said first error; and when said value indicative of said occurrence frequency of said first error is greater than or equal to a threshold value, recording said first error on said defect list.

10. The method as claimed in claim 9, further comprising a step of recording said first error on a second error list after said step of recording said first error on said defect list, said second error list for sequentially storing all of the errors detected while reading the data from said magnetic disk.

11. The method as claimed in claim 10, further comprising a step of storing said defect list on said magnetic disk as a final compilation of the defects of said magnetic disk.

12. The method as claimed in claim 9, further comprising a step of recording said first error on a second error list when said value indicative of said occurrence frequency of said first error is not greater than said threshold value, said second error list for sequentially storing all of the errors detected while reading the data from said magnetic disk.

13. The method as claimed in claim 9, wherein the data is read from said magnetic disk in accordance with a predetermined pattern formed on a surface of said magnetic disk.

14. The method as claimed in claim 9, wherein the data is read from said magnetic disk in accordance with predetermined stress conditions to increase a rate of detecting the defects of said magnetic disk.

15. The method as claimed in claim 14, wherein said predetermined stress conditions comprise: reading the data from said magnetic disk pursuant to an altered data pattern, reading the data from off-tracks, adjusting a data detection threshold, limiting a correction ability of a hardware error correcting code, and reading the data from said magnetic disk pursuant to an altered synchronization pattern.

16. The method as claimed in claim 14, further comprising a step of storing said defect list on said magnetic disk as a final compilation of the defects of said magnetic disk.

17. A method for logging errors detected on a surface of a magnetic disk in a hard disk drive device, comprising the steps of:

writing data onto and reading the data from said surface of said magnetic disk;

determining whether a first error has been detected while reading the data from said surface of said magnetic disk;

when said first error has been detected, determining whether said first error has been previously recorded on a defect list, said defect list for storing errors that are classified as defects of said magnetic disk;

when said first error has not been previously recorded on said defect list, determining whether said first error has been previously recorded on a first error list, said first error list for storing positions of errors on said magnetic disk and occurrence frequencies of the errors;

when said first error has not been previously recorded on said first error list, recording said first error on said first error list;

when said first error has been previously recorded on said first error list, increasing a value indicative of an occurrence frequency of said first error;

when said value indicative of said occurrence frequency of said first error is greater than or equal to a threshold value, recording said first error on said defect list; and recording said defect list onto said magnetic disk.

18. The method as claimed in claim 17, wherein the data is read from said magnetic disk in accordance with a predetermined pattern formed on a surface of said magnetic disk.

19. The method as claimed in claim 17, wherein the data is read from said magnetic disk in accordance with predetermined stress conditions to increase a rate of detecting the defects of said magnetic disk.

20. The method as claimed in claim 19, wherein said predetermined stress conditions comprise: reading the data from said magnetic disk pursuant to an altered data pattern, reading the data from off-tracks, adjusting a data detection threshold, limiting a correction ability of a hardware error correcting code, and reading the data from said magnetic disk pursuant to an altered synchronization pattern.

* * * * *